United States Patent
Shigeura

[11] 3,712,080
[45] Jan. 23, 1973

[54] SHAFT COUPLING DEVICE
[75] Inventor: Junichi Shigeura, Amagasaki, Japan
[73] Assignee: Mitsubishi Denki Kabushiki Kaisha, Tokyo, Japan
[22] Filed: Aug. 14, 1970
[21] Appl. No.: 63,800

[52] U.S. Cl. ..................................... 64/9 R, 64/14
[51] Int. Cl. ................................................ F16d 3/18
[58] Field of Search ........................................ 64/9, 14

[56] References Cited
UNITED STATES PATENTS

| | | | |
|---|---|---|---|
| 2,592,309 | 4/1952 | Meier | 64/9 |
| 2,608,071 | 8/1952 | Baudry | 64/9 |
| 3,279,216 | 10/1966 | Spaulding, Jr. | 64/9 |

*Primary Examiner*—Kenneth W. Sprague
*Attorney*—Robert E. Burns and Emmanuel J. Lobato

[57] ABSTRACT

The coupling device is composed of two flanged halves each having an internal gear encircling an external gear secured to each of driving and driven shafts. The flanged end is sealed by a resilient disc and the other end is sealed by a cover and a dust keeper. Both the halves can be fastened together by bolts extending through the flanges and the associated nuts. One annular gasket is operatively coupled to each of the flanged and other ends and has no fastening screws extending through it.

2 Claims, 5 Drawing Figures

3,712,080

SHAFT COUPLING DEVICE

BACKGROUND OF THE INVENTION

This invention relates to improvements in a shaft coupling device disposed between a driving shaft driven by an electric motor, a prime mover or the like for driving railway vehicles and a driven shaft operatively coupled to the driving shaft for transmitting a power.

Upon transmitting a power from the sprung weight system including an electric motor, a prime mover or the like and a driving shaft to the unsprung weight system including wheels, a reduction gear and a driven shaft on railway vehicles or the like, the interconnection of both the systems is generally required to have a high flexibility thereby to prevent vibrations, shocks, etc. caused on the unsprung weight system from being directly transmitted to the sprung weight system for the purpose of improving a comfortable ride in the vehicles.

For this purpose, flexible shaft coupling devices are commonly employed with trucks of railway vehicles. In operation the conventional type of such coupling devices is subject to vibrations, shocks, etc. which causes often the lubricant involved to leak through gaskets involved. Also it has been very difficult to assemble and disassemble the coupling device on the trucks in its predetermined narrow space.

SUMMARY OF THE INVENTION

According to the principles of the invention, there is provided a shaft coupling device for coupling a driving shaft to a driven shaft comprising, in combination, a pair of external gears fixedly secured to the opposite ends of said shafts, a pair of internal gears meshing with the associated external gears and including the opposite ends detachably interconnected, a pair of central resilient discs attached to the opposite ends of said internal gears by fastening screws, one gasket member inserted into an annular groove formed independently of said fastening screws on that end of each of the internal gears contacting the central disc to seal therebetween, a cover member fixed to the other end of each of said internal gears by another fastening screws, and another gasket member inserted into another annular groove formed independently of said another fastening screws on said cover member to seal between the cover member and the other end of each of said internal gears.

It is, therefore, one object of the invention to provide a shaft coupling device capable of being easily assembled and disassembled.

It is another object of the invention to provide a shaft coupling device capable of being easily mounted to and dismounted from a truck of a railway vehicle.

It is a further object of the invention to provide a shaft coupling device free from a fear that a lubricant involved will leak externally of the device.

BRIEF DESCRIPTION OF THE DRAWING

For a better understanding of the invention, reference should be had to the following description taken in conjunction with the accompanying drawings in which.

DESCRIPTION OF THE PREFERRED EMBODIMENT

Figure 1:
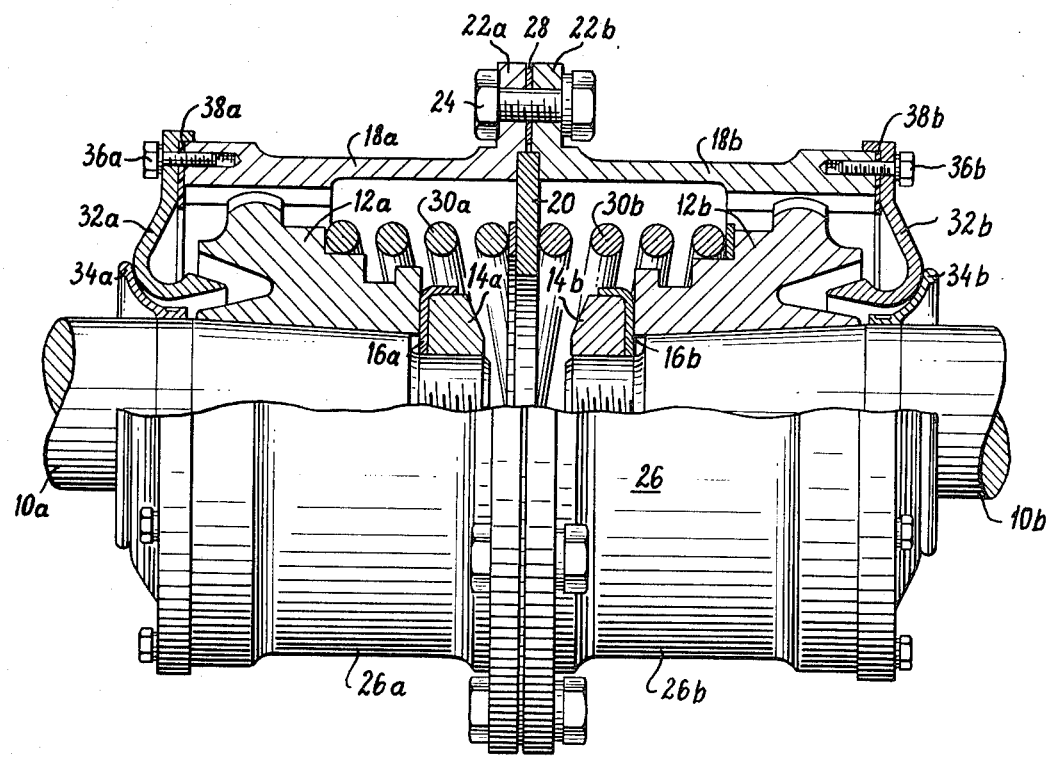
FIG. 1 is a plan view, partly in longitudinal section, of a shaft coupling device constructed in accordance with the principles of the prior art.

Referring now to FIG. 1 of the drawings, it is seen that a pair of driving and driven shafts 10a and b respectively are disposed in coaxial opposite relationship to form a spacing between the adjacent ends thereof. The shafts 10a and b have snugly fitted onto the respective tapered end portions a pair of external gears 12a and b by having engaged lock nuts 14a and b screw threaded onto the ends of the shafts to engage the end faces of the gears through washers 16a and b respectively. In this way the external gears are prevented from disengaging from the respective shafts. A pair of internal gears 18a and b in the form of hollow cylinders encircle and mesh with the associated external gears 12a and b and have one annular resilient disc 20 sandwiched between the opposing flanged ends 22a and b thereof. Then the flanges 22a and b at those opposite ends of the internal gears 18a and b are connected together by bolt and nut means 24 through an annular gasket 28 to form a cylindrical housing for the device generally designated by the reference numeral 26. One helical compression spring 30a or b is interposed between each of the external gears 12a or b and the central resilient disc 20 serving to limit a free axial movement of the associated internal gears 18a or b to maintain the external and internal gears in proper meshing relationship.

An annular spacing between the outer end of each gear 18a or b and the exposed portion of the associated shaft 10a or b is closed by a labyrinthine cover 32a or b cooperating with a dust keeper 34a or b for the purpose of preventing any ingress of dust into the device and any leakage of a lubricant involved from the interior of the device. The covers and dust keepers 32 and 34 respectively are preferable formed of any suitable flexible material such as rubber. The covers 32a and b each is fastened at its outer peripheral edge to the adjacent end of the housing 26 by a plurality of bolts 36a or b through an annular gasket 38a or b, while the dust keepers 34a and b each is suitably fixed at its inner peripheral edge to the adjacent shaft 10a or b. The dust keepers 34a and b have their free end portions brought into liquid tight relationship with respect to the associated covers 32a and b to seal the interior of the device off from the exterior thereof even in operation. Therefore, the lubricant disposed within the devive is effectively prevented from leaking externally of the device by the action of the centrifugal force due to a high speed rotation of the shafts.

In operation, an electric motor (not shown), for example, is energized to impart to the driving shaft 10a a torque which is, in turn, transmitted through the external gears 12a, the internal gear 18a, and the internal gear 18b to the external gear 12b integral with the driven shaft 10b. Under these circumstances, vibrations, shocks, etc. may occur on the side the driven shaft 10b. Such vibrations, shocks, etc. can be effectively absorbed partly by the relief of the toothed portions of the external gears 12a and b and mainly by the helical springs 30a and b compressable or expandable in response to such vibrations, shocks, etc.

Figure 2:
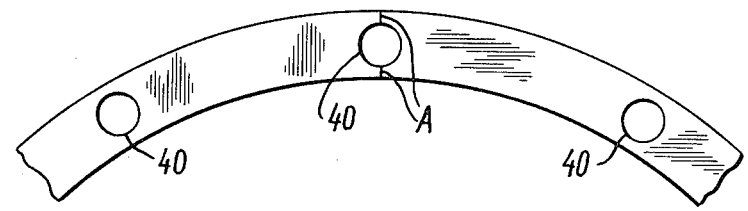
FIG. 2 is a fragmental plan view of a gasket used in the conventional shaft coupling device to prevent a lubricant from leaking through those portions thereof interconnected by bolts.

The gaskets 28, 38a and b as above described are in the form such as shown in FIG. 2 wherein one portion of the gasket 28 is typically illustrated. The gasket 28 is shown in FIG. 2 as having formed at predetermined angular intervals thereon bolt holes 40. In the arrangement shown in FIG. 1, the gaskets 28 and 38 sandwiched between the flanges 22a and b and between each of the covers 32a and b and the associated internal gears 18a and b respectively include bolts 24 or 36 through such holes 40. Therefore, during the assembling operation, especially when the bolts are being threaded into the holes 40, the latter are apt to forcedly enlarged in diameter by bolts 24 and 36. Also, the vibrations, shocks, etc. may occur during the operation of the shaft coupling device. Under these circumstances, the gasket is apt to crack along that direction of each hole 40 extending radially thereof as shown by lines labelled A in FIG. 2. This results in one of the factors of the leakage of a lubricant involved therethrough.

Figure 5:
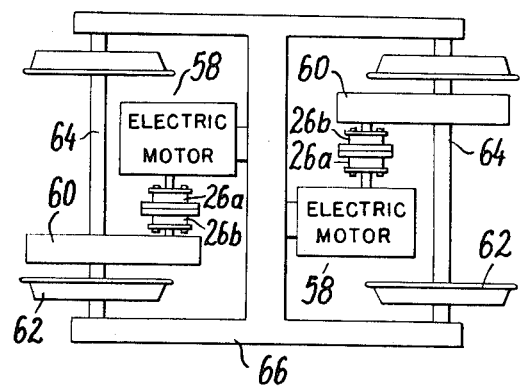
FIG. 5 is a diagrammatic plan view of a truck of an electric vehicle illustrating the shaft coupling device of the invention mounted on the truck.

Furthermore, the conventional type of shaft coupling device such as described in conjunction with FIGS. 1 and 2 has been very difficult to be assembled on trucks of railway vehicles at its predetermined narrow space. The conventional devices such as shown in FIG. 1 have been assembled by interconnecting the internal gears 18a and b by the bolt and nut means 24 in a narrow space between an electric motor 58 and a reduction gear 60 on the truck 66 as shown in FIG. 5. At the same time the gasket 28 was interposed between the gears 18a and b. Thereafter, it has been required to supply a lubricant to the device. Therefore the assembling operation has consume a lot of labor while the assembled device has a large probability of fear that the lubricant will leak from the same.

The invention contemplates to eliminate the above-mentioned disadvantages of the prior art device described in conjunction with FIGS. 1 and 2, and will be subsequently described in conjunction with FIGS. 3 to 5 wherein like reference numerals designate the components identical or similar to those shown in FIGS. 1 and 2.

Figure 3:
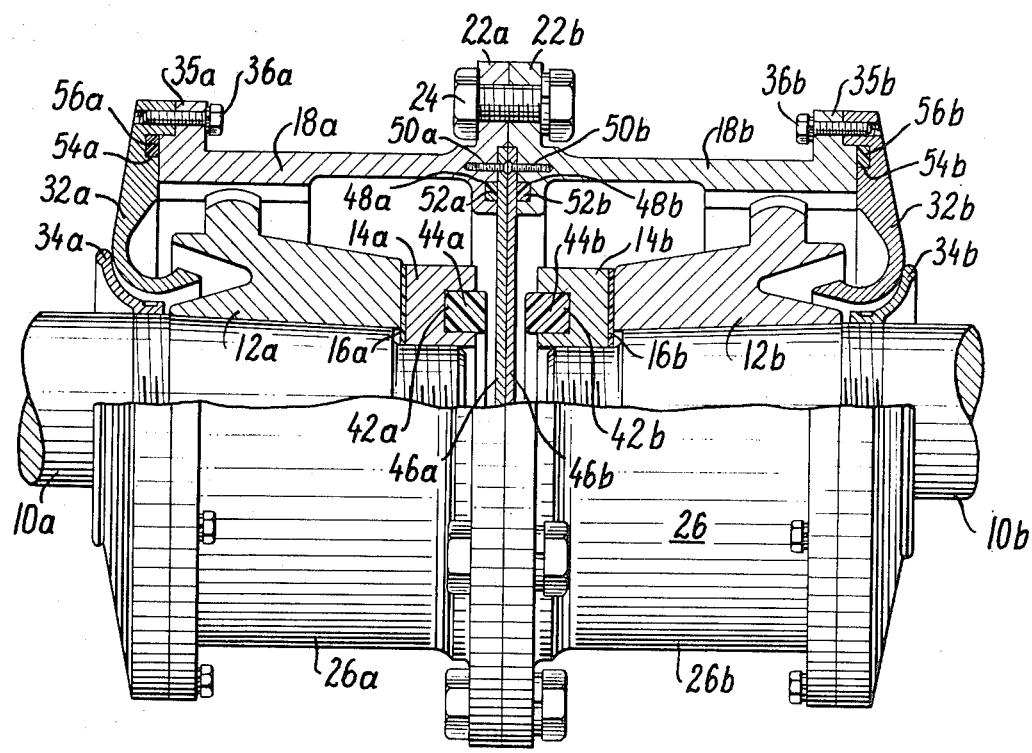
FIG. 3 is a plan view, partly in longitudinal section, of a shaft coupling device constructed in accordance with the principles of the invention.

By comparing FIG. 3 with FIG. 1, it is readily seen that the arrangement of FIG. 3 includes no helical springs 30a and b. Instead, the lock nuts 14a and b are provided on the opposing end faces with annular grooves 42a and b in directly opposite relationship. Then one annular shock absorber 44a or b of any suitable elastic material such as rubber is rigidly inserted into each of the grooves 42a or b to normally form a clearance between thereof and the respective resilient discs 46a and b. These absorbers are operative to prevent the internal gears 18a and b from being axially moved to a relatively great extent thereby to maintain the external and internal gears in proper meshing relationship.

In FIG. 3, it is also seen that instead of the single resilient disc 20 shown in FIG. 1, a pair of resilient discs 46a and b in contact with each other are fixed on the peripheral edge portion by recessed portions disposed on the inner opposite end faces of the internal gears 18a and b by respective sets of screws 50a and b so that the contacting opposite surfaces of both the discs are flush with the contacting opposite surfaces of the end flanges 22a and b having no gasket interposed therebetween. The end flanges 22a and b include the respective portions somewhat projecting internally and radially of the housing 26 and provided with annular grooves 48a and b in which annular gaskets or packings 52a and b are disposed in contact relationship with the resilient discs 46a and b. The gaskets or packings 52 may be of rubber and are located nearer to the central line of the housings 26 than the screws 50. Thus the none of the screws 50 extends through the gaskets or packings 52.

Also the labyrinthine cover 32a or b is fixed to the associated outer end of the internal gears 18a or b as in the arrangement of FIG. 1 excepting that the gear 18a or b is provided at the outer end with a flange 35a or b, and the bolt 36a or b is screw threaded from the inside of the flange 35a or b into the cover 32a or b with the gasket 38a or b omitted. However, as shown in FIG. 3, an annular gasket or packing 56a or b is disposed in each of annular grooves 54a and b formed to the covers so as to contact the end faces of the internal gears. Like the gaskets 52, the gaskets 56 are located nearer to the central axis of the housing 26 than the bolts 36 fastening the covers 32 with the results that the gaskets 56 have no volts 36 extending therethrough.

In other respects, the arrangement is substantially identical to that shown in FIG. 1.

As above described, the shaft coupling device of the invention has two separate discs 46a and b fixed to the inner opposite ends of the internal gears 18a and b by screws 50a and b respectively, and the gaskets 52a and b and 56a and b which have no volt holes thereon are disposed between the respective resilient discs 46a and b and inner opposite ends of the internal gears 18a and b and between the covers 32a and b and the other or outer ends of the internal gears 18a and b. Therefore, the shaft coupling device of the invention can be divided into two separate subassemblies each completely sealed by the resilient discs 46a and b, the cover and dust keepers 32 and 34 respectively thereby to prevent any ingress of foreign matters and any leakage of a lubricant involved. Therefore the device can be assembled into a unitary structure by first mounting the subassemblies on the associated driving and driven shafts at one end and supplied lubricant to the subassemblies. Then the subassemblies are required only to be interconnected by having their flanges 24a and b fastened together by bolt and nut means.

Figure 4:
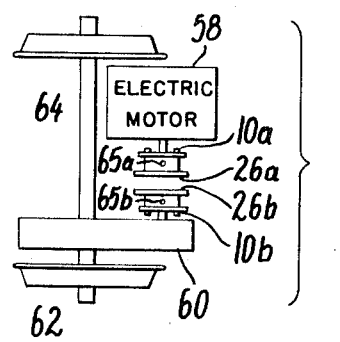
FIG. 4 is a diagrammatic view illustrating halves of the shaft coupling device of the invention mounted to the wheel side and the motor side.

More specifically, when the shaft coupling device of the invention is to be applied to an electric vehicle, one of the halves of the device, for example the half 26a, is mounted to one end of a driving shaft 10a of an electric motor 58, while the other half of the device 26b is secured to the driven shaft 10b which may be an input shaft of a reduction gear 60 coupled with wheels 62 through a wheel shaft 64 as shown in FIG. 4, after which a lubricant supplied to the halves through the respective holes 65a and b. Then the motor 58 is coupled to the wheels 62 on a truck 66 by fastening together the halves of the shaft coupling device 26a and b by the bolt and nut means through the flanges 24a and b of the device. Upon disassembling the device the process as above described can be repeated in the reverse manner. Thus, the assembling and disassembling operations of the device can be very easily performed on the truck 66 only by connecting and disconnecting one of the halves 26a or b to and from the other half 26b or a. Further, the labyrinthine cover 32 can be very easily connected to and disconnected from the associated internal gear 18 in a narrow space as shown in FIG. 5 by having the bolts 36 screw threaded into the same from the inner face of the flange formed at the outer end of the gear.

In contrast, as previously described, the conventional type of shaft coupling device such as described in conjunction with FIGS. 1 and 2 has been very difficult to be assembled on trucks of railway vehicles at its predetermined narrow space.

What I claim is:

1. A shaft coupling device for coupling a driving shaft to a driven shaft comprising, in combination, a pair of external gears fixedly secured to the opposite ends of said shafts, a pair of internal gears meshing with the associated external gears and including the opposite ends detachably interconnected, a pair of central resilient discs attached to the opposite ends of said internal gears by fastening screws, one gasket member inserted into an annular groove formed independently of said fastening screws on that end of each of the internal gears contacting the central disc to seal therebetween, a cover member fixed to the other end of each of said internal gears by another fastening screws, and another gasket member inserted into another annular groove formed independently of said another fastening screws on said cover member to seal between the cover member and the other end of each of said internal gears.

2. A shaft coupling device as claimed in claim 1 wherein each of said internal gears is provided at the other end with a flange, and said cover member is attached to the other end of each of said internal gears by said second fastening screws from the inner side of said flange.

* * * * *